United States Patent
Hosono et al.

(10) Patent No.: US 12,510,979 B2
(45) Date of Patent: Dec. 30, 2025

(54) INPUT DEVICE

(71) Applicant: Alps Alpine Co., Ltd., Tokyo (JP)

(72) Inventors: Kunio Hosono, Fukushima-ken (JP); Sadayuki Yaginuma, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/796,505

(22) Filed: Aug. 7, 2024

(65) Prior Publication Data
US 2025/0068261 A1 Feb. 27, 2025

(30) Foreign Application Priority Data
Aug. 25, 2023 (JP) .................... 2023-137108

(51) Int. Cl.
*G06F 3/0338* (2013.01)
*H01H 25/04* (2006.01)

(52) U.S. Cl.
CPC ........... *G06F 3/0338* (2013.01); *H01H 25/04* (2013.01)

(58) Field of Classification Search
CPC ...... G06F 3/0338; H01H 25/04; H01H 23/02; H01H 23/12; H01H 23/14; G01L 5/1627
See application file for complete search history.

(56) References Cited

U.S. PATENT DOCUMENTS

| | | | | |
|---|---|---|---|---|
| 5,278,557 A | * | 1/1994 | Stokes | H03K 17/965 200/520 |
| 7,755,603 B2 | | 7/2010 | Hirano et al. | |
| 2003/0085793 A1 | * | 5/2003 | Inoue | H01H 3/0213 338/68 |
| 2004/0257339 A1 | * | 12/2004 | Takahashi | G06F 3/0338 345/156 |
| 2005/0190153 A1 | * | 9/2005 | Ushimaru | G05G 9/04796 345/161 |
| 2009/0084214 A1 | * | 4/2009 | Sakai | A43C 15/04 74/471 XY |
| 2010/0307896 A1 | * | 12/2010 | Nogami | H01H 9/047 200/293 |
| 2011/0221690 A1 | * | 9/2011 | Miyoshi | G06F 3/0338 345/173 |
| 2012/0286977 A1 | * | 11/2012 | Yamazaki | H01H 25/04 341/35 |

(Continued)

FOREIGN PATENT DOCUMENTS

| | | |
|---|---|---|
| JP | 2005-338919 A | 12/2005 |
| JP | 2013-047871 A | 3/2013 |

*Primary Examiner* — Ibrahim A Khan
(74) *Attorney, Agent, or Firm* — Harness, Dickey & Pierce, P.L.C.

(57) ABSTRACT

An input device includes a strain generation body having a base and a pillar section extending from the base in a vertical direction, and four strain sensors disposed to the base of the strain generation body. The four strain sensors are disposed in four directions different by 90° with respect to a center of the pillar section, the pillar section has protrusions on an outer circumferential surface in a tip portion, the protrusions protruding in a horizontal direction, the protrusions includes two protrusions protruding in directions opposite to each other with respect to the center of the pillar section, and the two protrusions are provided, with respect to the center of the pillar section, in directions different from the four directions in which the four strain sensors are disposed.

8 Claims, 10 Drawing Sheets

(56) References Cited

U.S. PATENT DOCUMENTS

| | | | | |
|---|---|---|---|---|
| 2012/0287033 | A1* | 11/2012 | Yamazaki | H01H 25/04 |
| | | | | 345/156 |
| 2013/0051889 | A1 | 2/2013 | Kimura et al. | |
| 2016/0103505 | A1* | 4/2016 | Fukumoto | G06F 3/0338 |
| | | | | 345/161 |
| 2016/0361634 | A1* | 12/2016 | Gassoway | G06F 3/0338 |
| 2017/0024063 | A1* | 1/2017 | Shimada | B60K 35/53 |
| 2017/0368451 | A1* | 12/2017 | Tiffany | A63F 13/22 |
| 2018/0364817 | A1* | 12/2018 | Ota | G06F 3/016 |
| 2021/0012985 | A1* | 1/2021 | Urayama | H01H 19/04 |
| 2021/0250471 | A1* | 8/2021 | Kikuchi | H04N 23/69 |
| 2022/0100223 | A1* | 3/2022 | Hosono | H01H 25/04 |

* cited by examiner

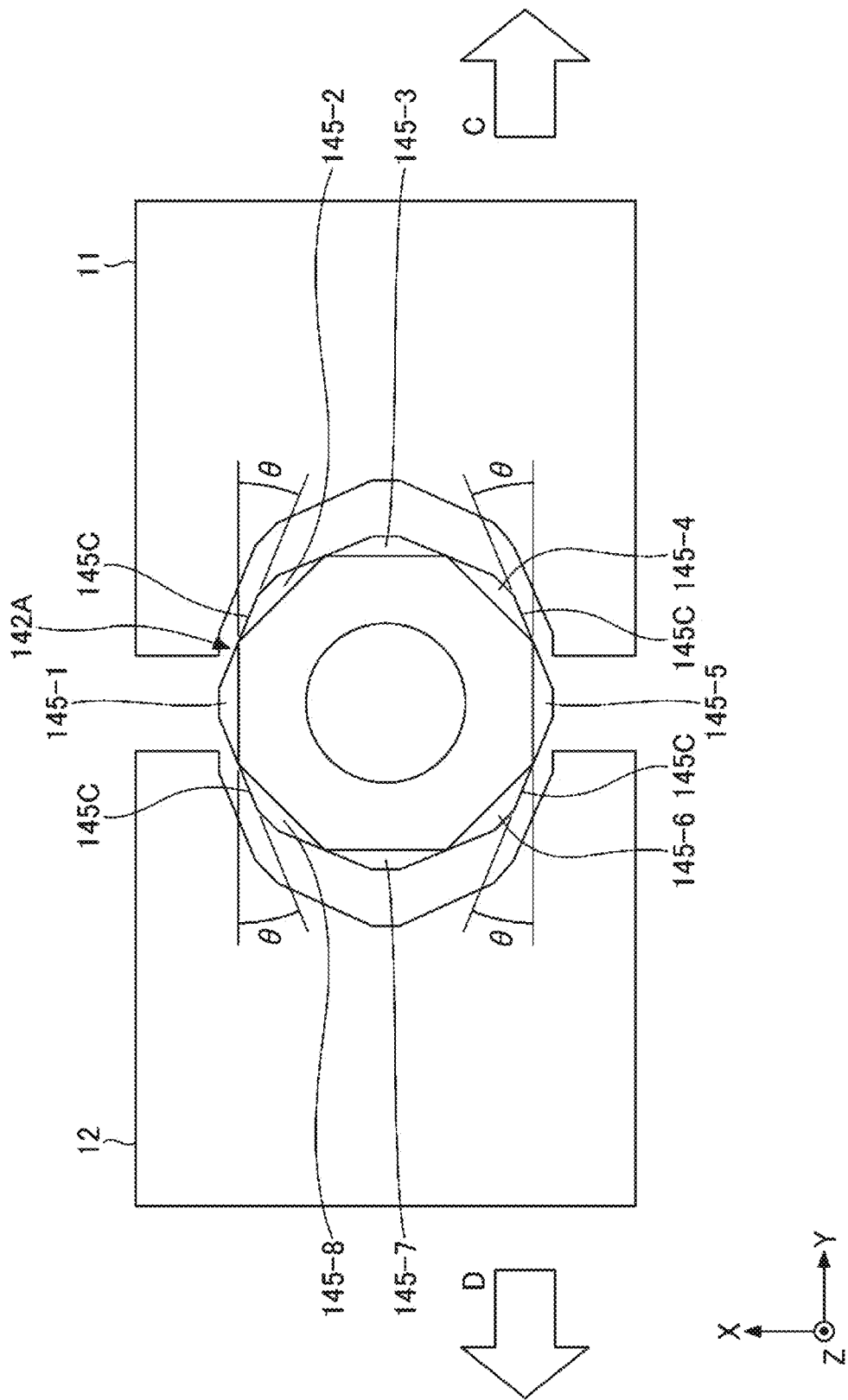

INPUT DEVICE

CLAIM OF PRIORITY

This application claims benefit of Japanese Patent Application No. 2023-137108 filed on Aug. 25, 2023, which is hereby incorporated by reference in its entirety.

BACKGROUND OF THE INVENTION

1. Field of the Invention

The present invention relates to an input device.

2. Description of the Related Art

U.S. Pat. No. 7,755,603B2 discloses a coordinate input device configured to detect a direction and a magnitude of a load in the horizontal direction applied to a stick standing upright from a base of a strain generation body by detecting a strain in the strain generation body by using a strain detection sensor provided to the base of the strain generation body.

However, in the coordinate input device in U.S. Pat. No. 7,755,603B2, in inspecting an output of the strain detection sensor by applying a load to the stick, it is difficult to apply the load to a predetermined position from a predetermined direction, and this may result in variations in the load application direction and position in each inspection, and the output of the detection sensor may be affected accordingly.

SUMMARY OF THE INVENTION

An input device according to an embodiment includes a strain generation body having a base and a pillar section extending from the base in a vertical direction, and four strain sensors disposed to the base of the strain generation body. The four strain sensors are disposed in four directions different by 90° with respect to a center of the pillar section, the pillar section has protrusions on an outer circumferential surface in a tip portion, the protrusions protruding in a horizontal direction, the protrusions includes two protrusions protruding in directions opposite to each other with respect to the center of the pillar section, and the two protrusions are provided, with respect to the center of the pillar section, in directions different from the four directions in which the four strain sensors are disposed.

The input device according to the embodiment can apply a load to an accurate position from an accurate direction in a simple inspection of the four strain sensors for detecting a horizontal operation.

BRIEF DESCRIPTION OF THE DRAWINGS

FIG. 10 is a view schematically illustrating a manufacturing process of a strain generation body in an input device according to an embodiment.

DESCRIPTION OF THE PREFERRED EMBODIMENTS

Figure 1:
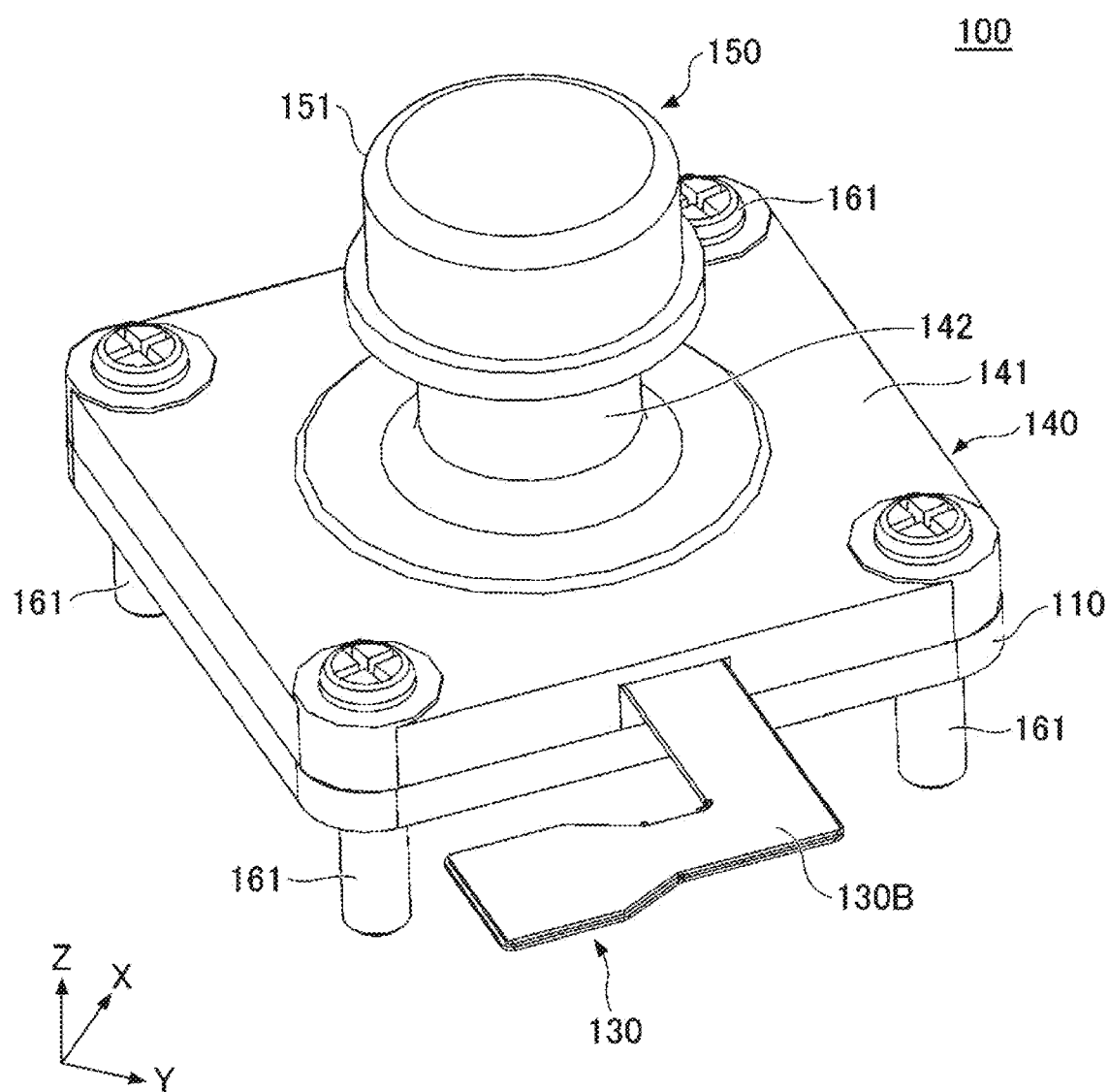
FIG. 1 is an external perspective view of an input device according to an embodiment.

Hereinafter, an embodiment will be described. In the following description, for convenience, the X-axis direction in the drawings denotes the front-rear direction, the Y-axis direction in the drawings denotes the left-right direction, and the Z-axis direction in the drawings denotes the up-down direction, in which, the X-axis positive direction denotes the forward direction, the Y-axis positive direction denotes the rightward direction, and the Z-axis positive direction denotes the upward direction. It should be noted that these directions denote relative positional relationships in a device and do not limit device installation directions or operation directions, and similar relative positional relationships in the device may have different installation directions or operation directions and those are all included within the scope of the invention.

Embodiment

Structure of Input Device 100

Figure 2:
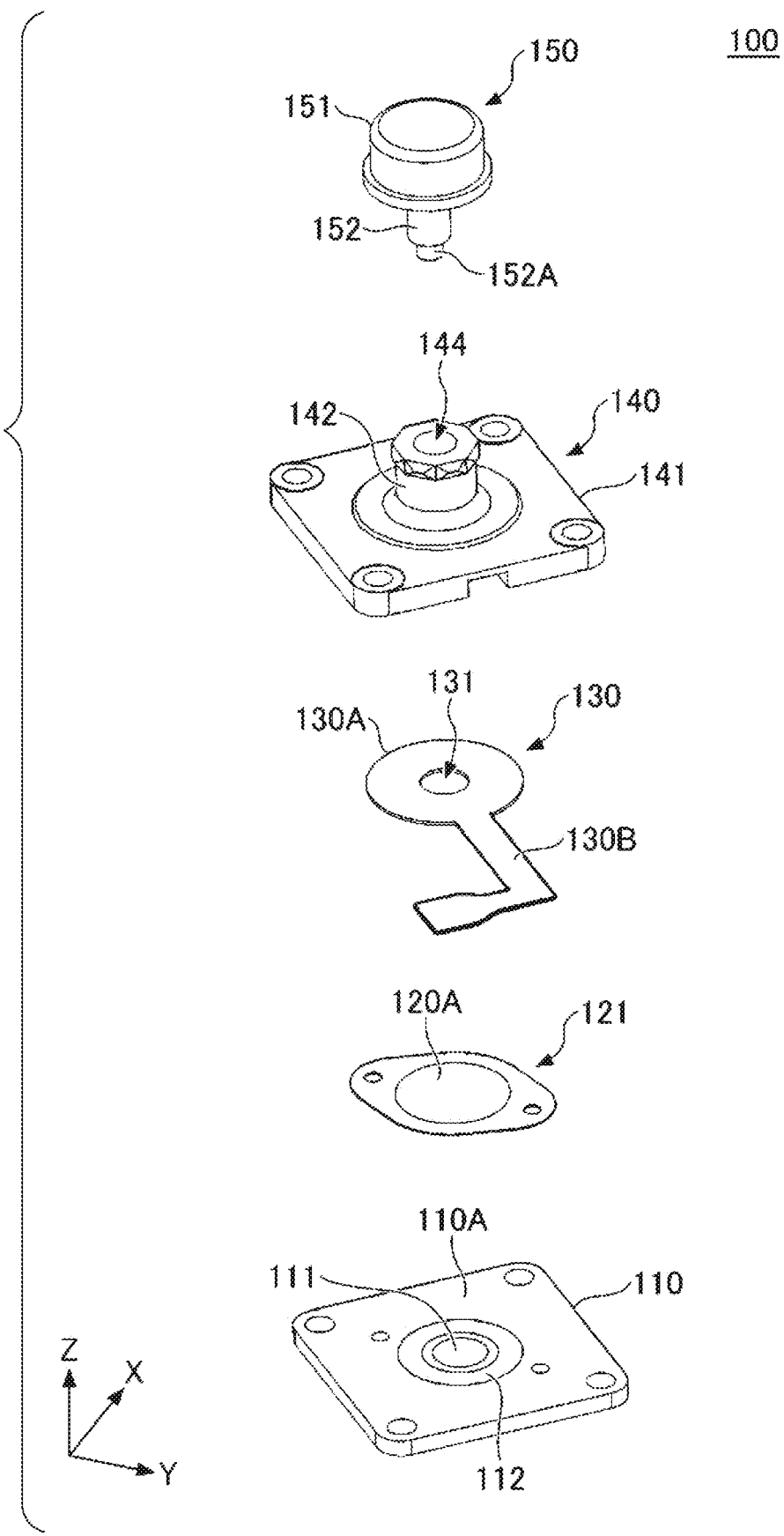
FIG. 2 is an exploded perspective view of an input device according to an embodiment viewed from above.
Figure 3:
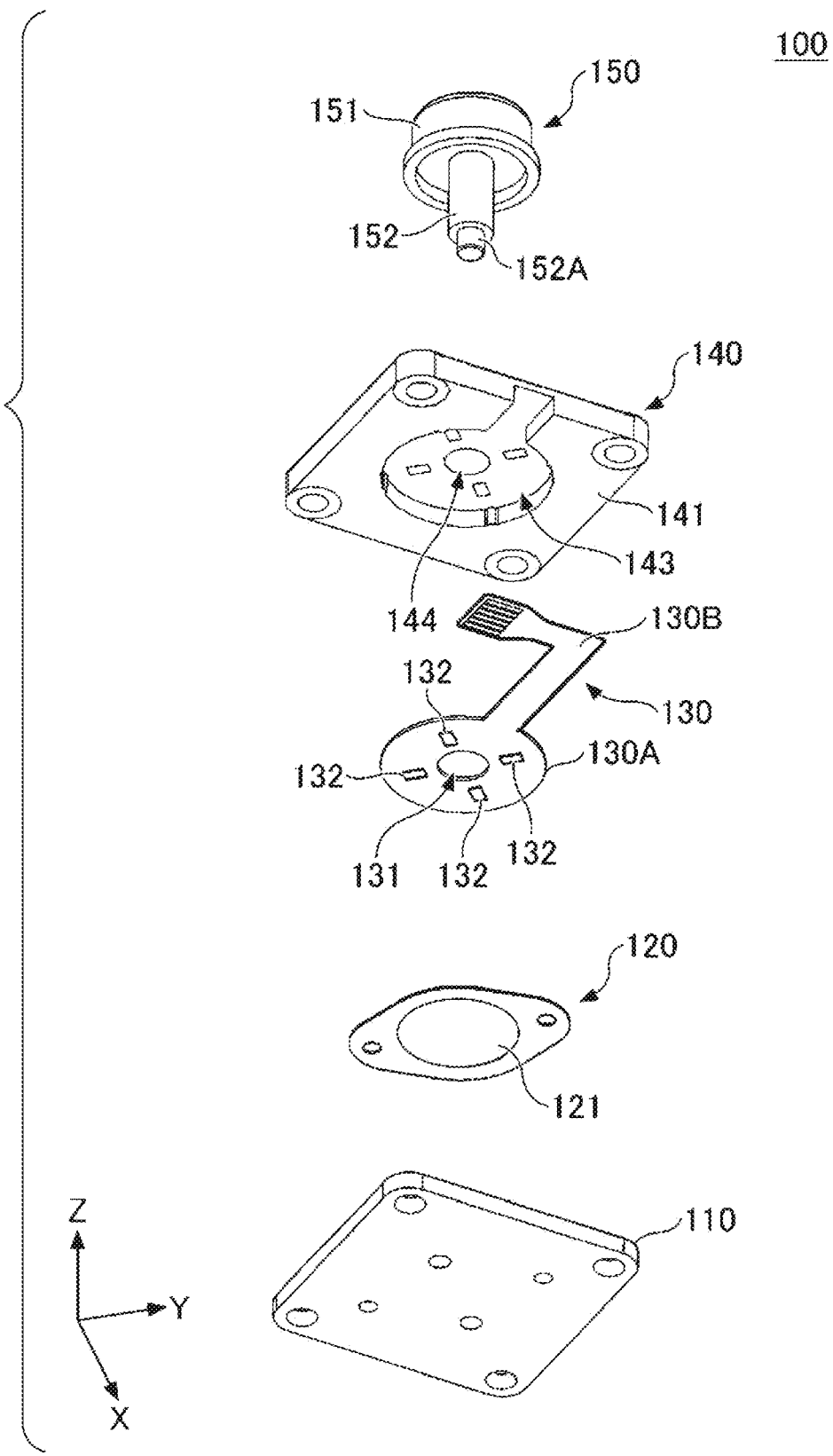
FIG. 3 is an exploded perspective view of an input device according an embodiment viewed from below.
Figure 4:
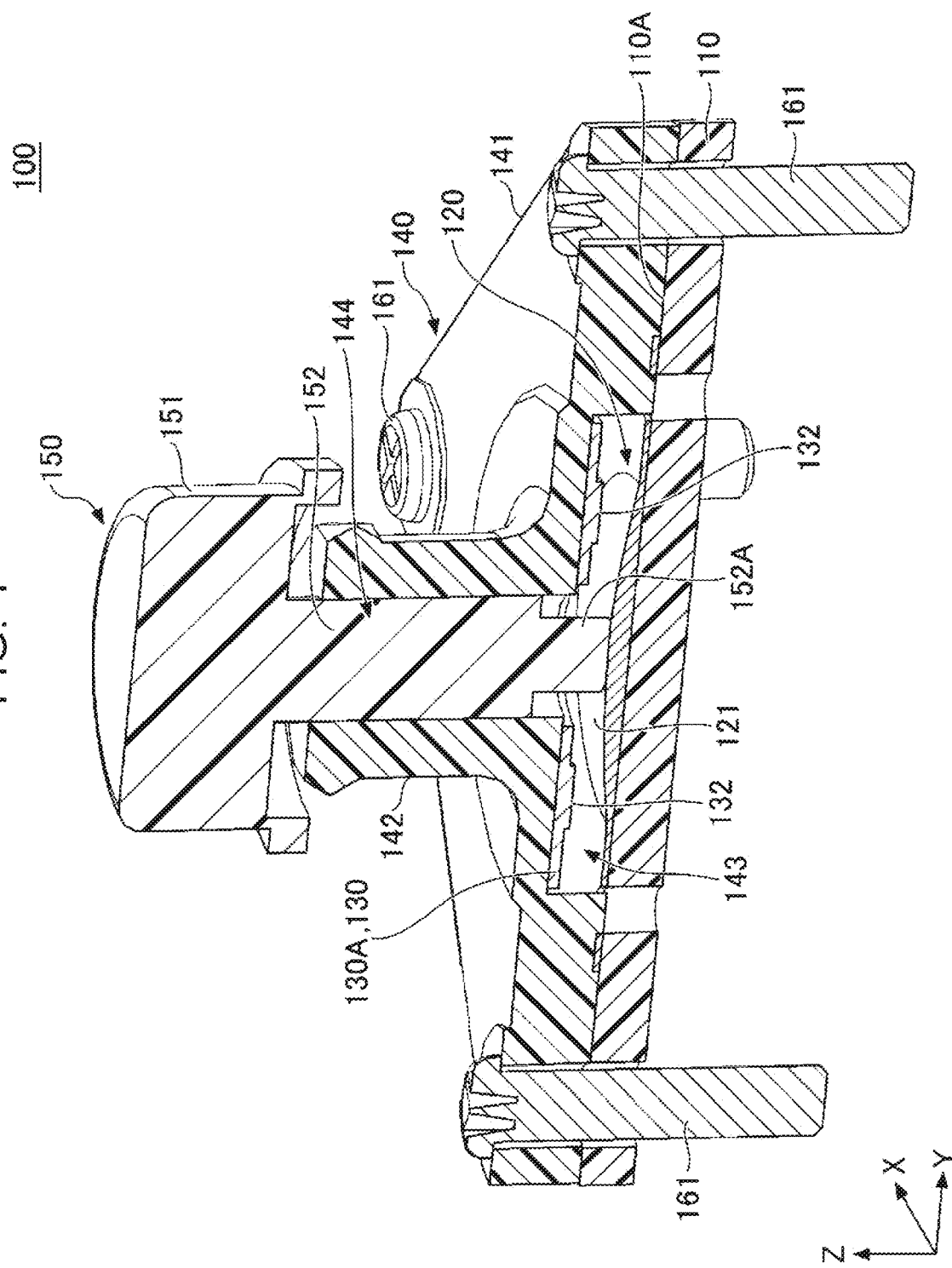
FIG. 4 is a perspective cross-sectional view of an input device according to an embodiment.

FIG. 1 is an external perspective view of an input device 100 according to an embodiment. FIG. 2 is an exploded perspective view of the input device 100 according to an embodiment viewed from above. FIG. 3 is an exploded perspective view of the input device 100 according an embodiment viewed from below. FIG. 4 is a perspective cross-sectional view of the input device 100 according to an embodiment.

The input device 100 illustrated in FIG. 1 to FIG. 3 can be used in, for example, game machine controllers, notebook personal computers, and other devices. The input device 100 is an input device that allows horizontal operations in the horizontal directions (the X-axis direction and the Y-axis direction) and pressing operations in the downward direction (the Z-axis negative direction). As illustrated in FIG. 1 to FIG. 3, the input device 100 includes a board 110, a movable contact 120, a flexible substrate 130, a strain generation body 140, and an operation member 150.

The board 110 is disposed on the lowermost side (Z-axis negative side) of the input device 100 and is a plate-like member that is made of resin and flat. In this embodiment, for example, the board 110 has a square shape in plan view when viewed from above (Z-axis positive direction).

The board 110 has a circular first stationary contact 111 and an annular second stationary contact 112 that surrounds the first stationary contact 111 in a central portion of an upper surface 110A of the board 110. The first stationary contact 111 and the second stationary contact 112 are both thin metal plates.

The board 110 is screwed on an installation surface with four screws 161 that pass through the board 110 and a base 141 of the strain generation body 140 in the up-down direction (Z-axis direction) in a state in which the board 110 is stacked with the base 141 of the strain generation body 140.

The movable contact 120 is a thin metal plate and is stacked over the first stationary contact 111 and on the second stationary contact 112 of the board 110. The movable contact 120 has a domed dome portion 121 that protrudes upward (Z-axis positive direction) in a central part of the movable contact 120.

The movable contact 120 functions as a "switch section" together with the first stationary contact 111 and the second stationary contact 112. The movable contact 120 is always in contact with the second stationary contact 112 in an outer edge portion of the dome portion 121. The central part of the dome portion 121 in the movable contact 120 is away from the first stationary contact 111 when no pressing operation is made to the operation member 150. In the movable contact 120, when a pressing operation is performed using the operation member 150, the dome portion 121 is pressed by a pressing portion 152A of the operation member 150 to be reversed, and thereby, the central part of the dome portion 121 comes into contact with the first stationary contact 111. This operation enables the movable contact 120 to make the first stationary contact 111 and the second stationary contact 112 to be electrically connected with each other via the movable contact 120. The movable contact 120 provides tactile response when the dome portion 121 is reversed.

The flexible substrate 130 is a flexible film-like wiring member and is disposed in a recessed portion 143 in a lower surface of the base 141 of the strain generation body 140 in a state in which the flexible substrate 130 is fixed to a ceiling surface of the recessed portion 143. The flexible substrate 130 is bonded to the ceiling surface of the recessed portion 143 with a bonding means, such as an adhesive, in the recessed portion 143 of the strain generation body 140. The flexible substrate 130 has a base 130A and an extension portion 130B.

The base 130A is an annular portion and is disposed in a central portion in the lower surface of the base 141 of the strain generation body 140. The base 130A has a circular central opening 131 in a central portion. Through the central opening 131, a shaft portion 152 of the operation member 150 is inserted.

The extension portion 130B is an L-shaped strip portion that extends outward from a peripheral edge portion of the base 130A. The extension portion 130B is configured, at its tip portion, to be electrically connected to an external component.

In the flexible substrate 130, four strain sensors 132 are disposed on the same circumference and at regular intervals (i.e. 90-degree intervals) around the central opening 131 in a lower surface of the base 130A. Each of the four strain sensors 132 is a resistive element printed on the lower surface of the base 130A. The four strain sensors 132 are example "load sensors", and are configured to detect a load in the horizontal direction applied to a pillar section 142 of the strain generation body 140.

More specifically, the strain sensors 132 are disposed on the lower surface of the base 130A of the flexible substrate 130 in the four directions with respect to the central opening 131 respectively, that is, the rightward direction (the Y-axis positive direction), the leftward direction (the Y-axis negative direction), the forward direction (the X-axis positive direction), and the rearward direction (the X-axis negative direction). In other words, the four strain sensors 132 are disposed in a cross arrangement around the central opening 131.

The detection directions of the respective four strain sensors 132 are in radial directions with respect to the pillar section 142. Accordingly, when a horizontal operation is performed on the operation member 150 and the base 141 (around the base of the pillar section 142) is deformed via the pillar section 142, the four strain sensors 132 each deform (extend or contract) in response to the deformation of the base 141, and thereby, the resistance values change. With this structure, the four strain sensors 132 each can detect strain in the base 141 caused by the horizontal operation performed on the pillar section 142, and thus, the load in the horizontal direction applied to the pillar section 142 by the horizontal operation of the operation member 150 can be detected.

The flexible substrate 130 can output a load detection signal (analog signal) representing a load in the horizontal direction applied to the pillar section 142 detected by each of the four strain sensors 132 via the extension portion 130B to the outside (control device 170).

More specifically, the two strain sensors 132 disposed on the front side (X-axis positive direction) and the rear side (X-axis negative direction) with respect to the central opening 131 are electrically connected in series with each other. In response to a load in the X-axis direction applied to the pillar section 142, one strain sensor 132 extends and the other strain sensor 132 contracts and the voltage value at a midpoint between the two strain sensors 132 changes. Based on the voltage value (load detection signal) at the midpoint, the external (output destination of the load detection signal) device (control device 170) can detect the load in the X-axis direction applied to the pillar section 142.

Similarly, the two strain sensors 132 disposed on the right side (Y-axis positive direction) and the left side (Y-axis negative direction) with respect to the central opening 131 are electrically connected in series with each other. In response to a load in the Y-axis direction applied to the pillar section 142, one strain sensor 132 extends and the other strain sensor 132 contracts and the voltage value at a midpoint between the two strain sensors 132 changes. Based on the voltage value (load detection signal) at the midpoint, the external (output destination of the load detection signal) device (control device 170) can detect the load in the Y-axis direction applied to the pillar section 142.

The strain generation body 140 is a resin member that deforms in response to an application of an operation load via the operation member 150 when a horizontal operation is performed on the operation member 150. The strain generation body 140 includes the base 141 and the pillar section 142.

The base 141 is a flat plate-like member having a constant thickness in the up-down direction (Z-axis direction). The base 141 has a shape similar to that of the board 110, that is, a square shape in plan view when viewed from above (Z-axis positive direction).

The recessed portion 143 that is recessed upward is formed in the lower surface of the base 141. The recessed portion 143 has a shape similar to that of the flexible substrate 130 (the base 130A and a part of the extension portion 130B) in plan view when viewed from below (Z-axis negative direction). With this structure, the strain generation body 140 can accommodate the flexible substrate 130 (the base 130A and a part of the extension portion 130B) inside the recessed portion 143.

The pillar section 142 is a columnar portion of the base 141 vertically provided upward (Z-axis positive direction) from a central portion of the upper surface of the base 141. The pillar section 142 transmits a load to the base 141 when a horizontal operation is performed (i.e. when a load is applied in the horizontal direction) on the operation member 150. The load transmitted via the pillar section 142 causes a strain in the portion around the pillar section 142 in the base 141.

A circular through hole 144 that passes through the base 141 and the pillar section 142 in the up-down direction (Z-axis direction) is formed in a central part of the strain generation body 140. Into the through hole 144, the shaft portion 152 of the operation member 150 is inserted. With this structure, the strain generation body 140 can support the operation member 150 movably in the up-down direction (Z-axis direction).

The operation member 150 is a resin member disposed above the pillar section 142 of the strain generation body 140. The operation member 150 has an operation portion 151 and the shaft portion 152.

The operation portion 151 is a columnar portion having a diameter larger than that of the pillar section 142 of the strain generation body 140 and is provided at an upper end of the operation member 150. The operation portion 151 is disposed above the pillar section 142. The operator touches the operation portion 151 to perform a horizontal operation and a pressing operation.

The shaft portion 152 is a columnar portion having a diameter smaller than that of the pillar section 142 of the strain generation body 140 and is vertically provided downward (Z-axis negative direction) from a central part of the lower surface of the operation portion 151. The shaft portion 152 of the operation member 150 is inserted into the through hole 144 of the strain generation body 140. With this structure, the operation member 150 can be supported by the strain generation body 140 movably in the up-down direction (Z-axis direction). The operation member 150 is moved downward in response to a pressing operation (i.e. an operation for applying a downward load) performed by the operator. In response to a horizontal operation (i.e. an operation for applying a load in the horizontal direction) performed by the operator, the shaft portion 152 applies a load from the inside to the pillar section 142 of the strain generation body 140.

A columnar pressing portion 152A is provided in a lower end portion of the shaft portion 152. The pressing portion 152A is provided above (Z-axis positive side) the central portion of the movable contact 120 to face the central portion of the movable contact 120. In response to a pressing operation by using the operation member 150, the pressing portion 152A presses the central portion of the movable contact 120 to elastically deform the central portion of the movable contact 120, thereby bringing the central portion of the movable contact 120 to come into contact with the first stationary contact 111.

In the input device 100 having the above-described structure, when a horizontal load is applied to the operation member 150, the load is transmitted via the shaft portion 152 to the pillar section 142 of the strain generation body 140, and thereby, a deformation occurs around the pillar section 142 in the base 141 of the strain generation body 140. The input device 100 detects the deformation using the four strain sensors 132 to detect the horizontal operation of the operation member 150.

In response to a pressing operation by using the operation member 150, in the input device 100, the pressing portion 152A of the operation member 150 presses the dome portion 121 of the movable contact 120 to reverse the dome portion 121 of the movable contact 120, thereby causing the central portion of the dome portion 121 to come into contact with the first stationary contact 111. This operation enables the first stationary contact 111 and the second stationary contact 112 to electrically contact with each other via the movable contact 120, and thus, the input device 100 can detect the pressing operation performed using the operation member 150.

Here, the input device 100 according to the embodiment includes the operation member 150, which is disposed above the pillar section 142 and has the shaft portion 152 that passes through the pillar section 142 in the vertical direction (Z-axis direction), the movable contact 120, which is disposed under (Z-axis negative side) the shaft portion 152, and the first stationary contact 111, which is disposed under (Z-axis negative side) the movable contact 120.

With this structure, when the operator performs a horizontal operation on the operation member 150, the input device 100 according to the embodiment transmits the load to the pillar section 142 of the strain generation body 140 via the shaft portion 152 and detects the horizontal operation.

On the other hand, when the operator performs a pressing operation on the operation member 150, the input device 100 according to the embodiment presses the movable contact 120 with the operation member 150 to cause the movable contact 120 to come into contact with the first stationary contact 111, thereby detecting the pressing operation.

As described above, the input device 100 according to the embodiment includes the operation member 150 having the shaft portion 152 that passes through the pillar section 142 in the vertical direction (Z-axis direction). With this relatively simple structure, the input device 100 can detect a horizontal operation and a pressing operation.

Configuration of Control System in Input Device 100

Figure 5:
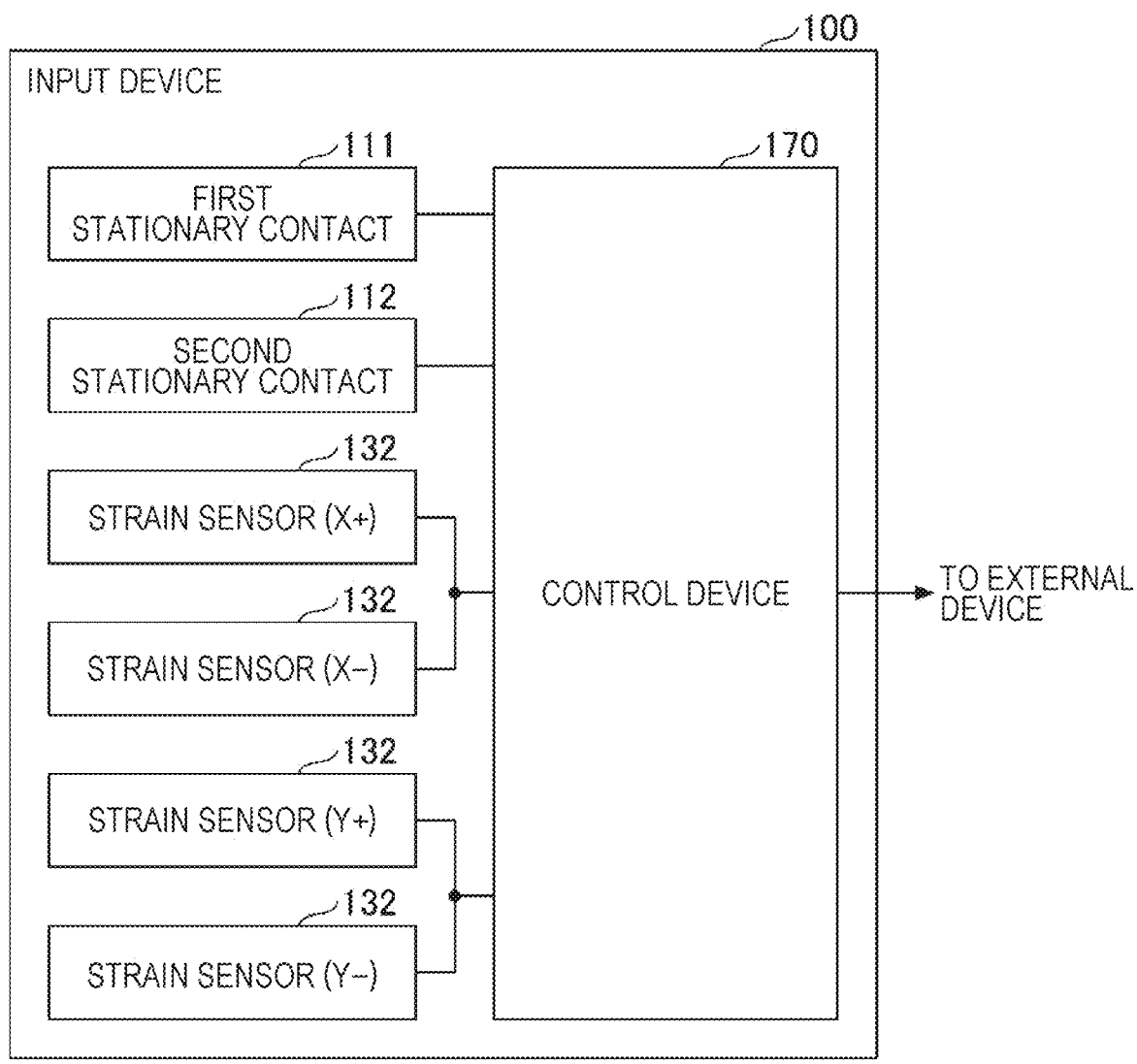
FIG. 5 is a block diagram illustrating a configuration of a control system in an input device according to an embodiment.

FIG. 5 is a block diagram illustrating a configuration of a control system in the input device 100 according to the embodiment.

As illustrated in FIG. 5, the control system in the input device 100 includes the first stationary contact 111, the second stationary contact 112, the four strain sensors 132, and the control device 170.

The control device 170 is an example "controller". The control device 170 is electrically connected to the first stationary contact 111 and the second stationary contact 112. This configuration enables the control device 170 to detect whether the first stationary contact 111 and the second stationary contact 112 are electrically connected with each other. When the control device 170 detects that the first stationary contact 111 and the second stationary contact 112 are electrically connected with each other via the movable contact 120, the control device 170 can detect that the switch section is on, that is, can detect a pressing operation performed by using the operation member 150.

The control device 170 is electrically connected to each of the four strain sensors 132. More specifically, the control device 170 is connected to a bridge circuit that includes the four strain sensors 132.

The control device 170 can detect, based on a voltage value at the midpoint between the two strain sensors 132 (the strain sensor (X+) and the strain sensor (X−)) provided in the X-axis direction, a load in the X-axis direction applied to the pillar section 142 due to a horizontal operation on the operation member 150.

The control device 170 can detect, based on a voltage value at a midpoint between the two strain sensors 132 (the strain sensor (Y+) and the strain sensor (Y−)) provided in the Y-axis direction, a load in the Y-axis direction applied to the pillar section 142 due to a horizontal operation on the operation member 150.

The control device 170 includes a processor (for example, a central processing unit (CPU)), memory (for example, read-only memory (ROM), and random access memory (RAM)), and other components. The control device 170 implements a program stored in the memory using the processor to implement each function of the control device 170. For example, the control device 170 is an integrated circuit (IC).

Structure of Pillar Section 142 in Strain Generation Body 140

Figure 6:
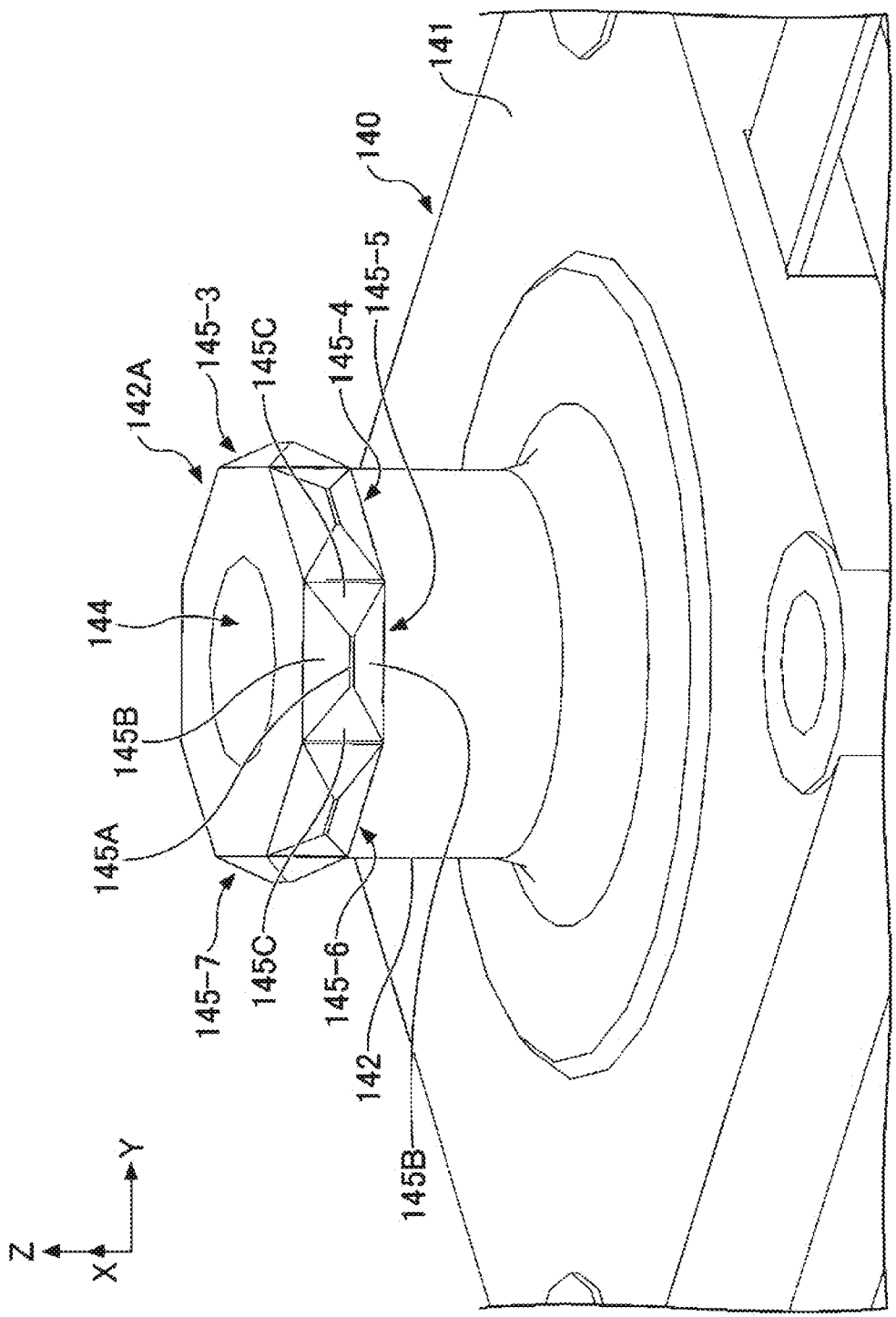
FIG. 6 is an enlarged perspective view of a structure of a pillar section of a strain generation body in an input device according to an embodiment.
Figure 7:
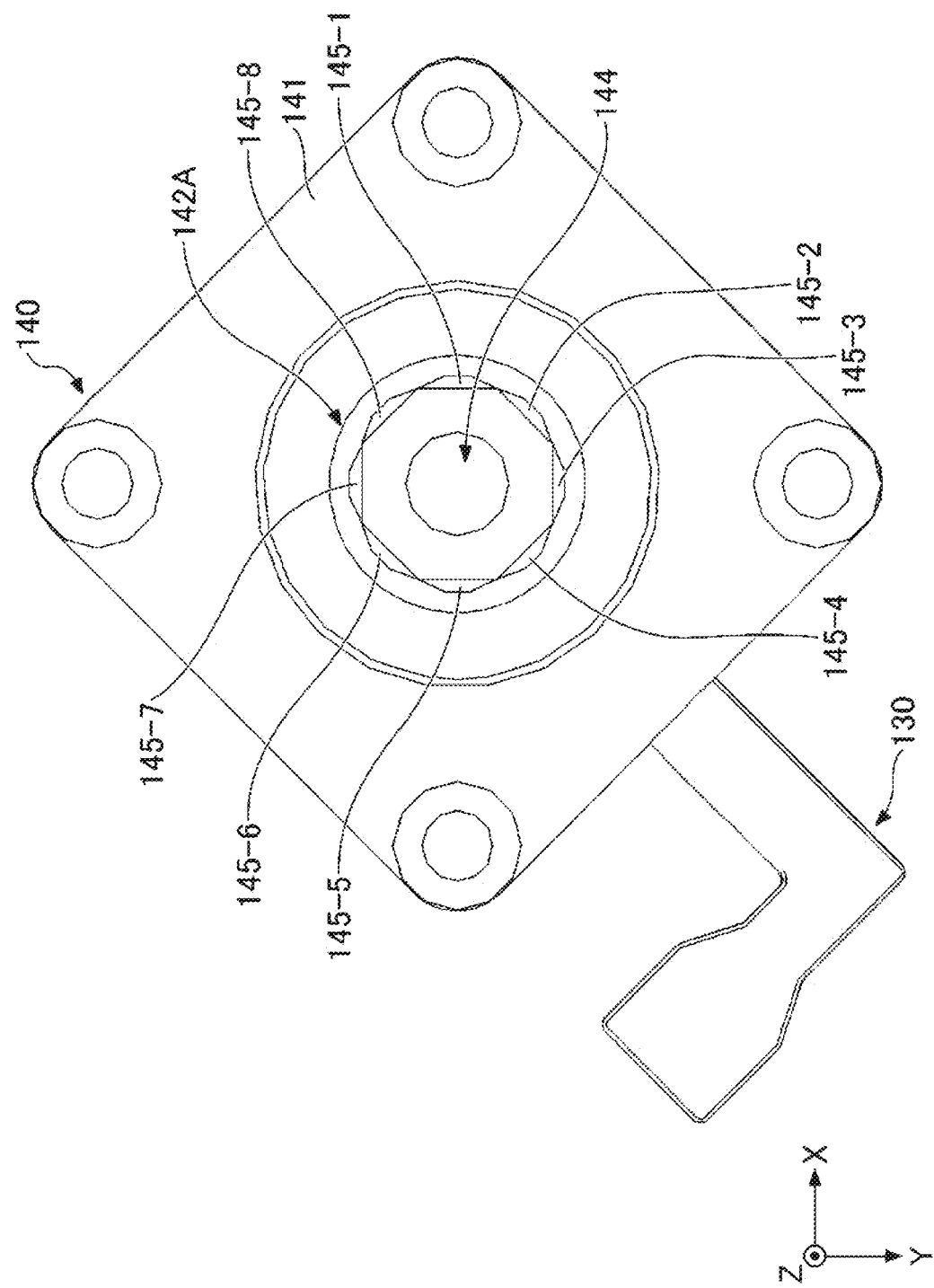
FIG. 7 is a plan view of a structure of a pillar section of a strain generation body in an input device according to an embodiment.
Figure 8:
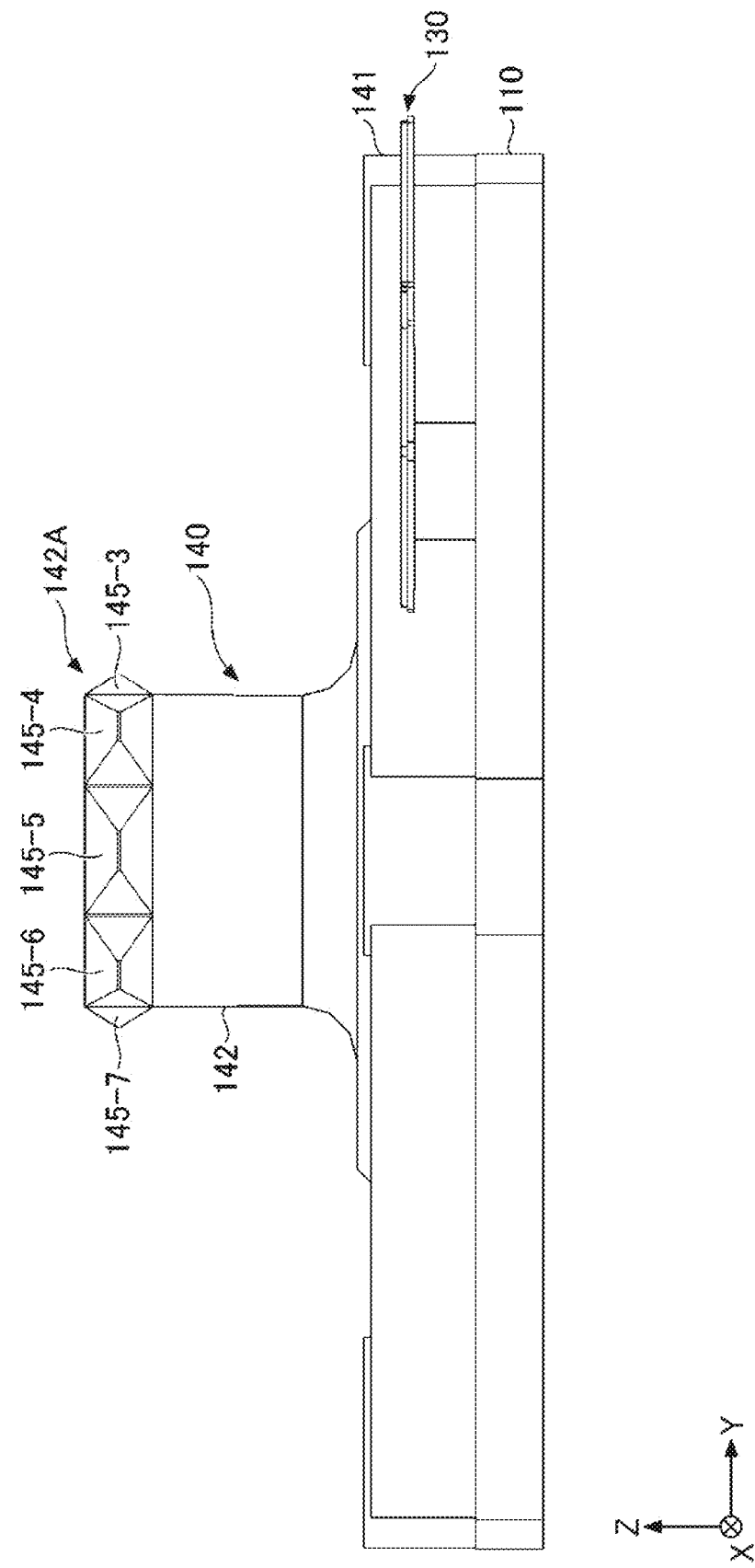
FIG. 8 is a front view illustrating a structure of a pillar section of a strain generation body in an input device according to an embodiment.
Figure 9:
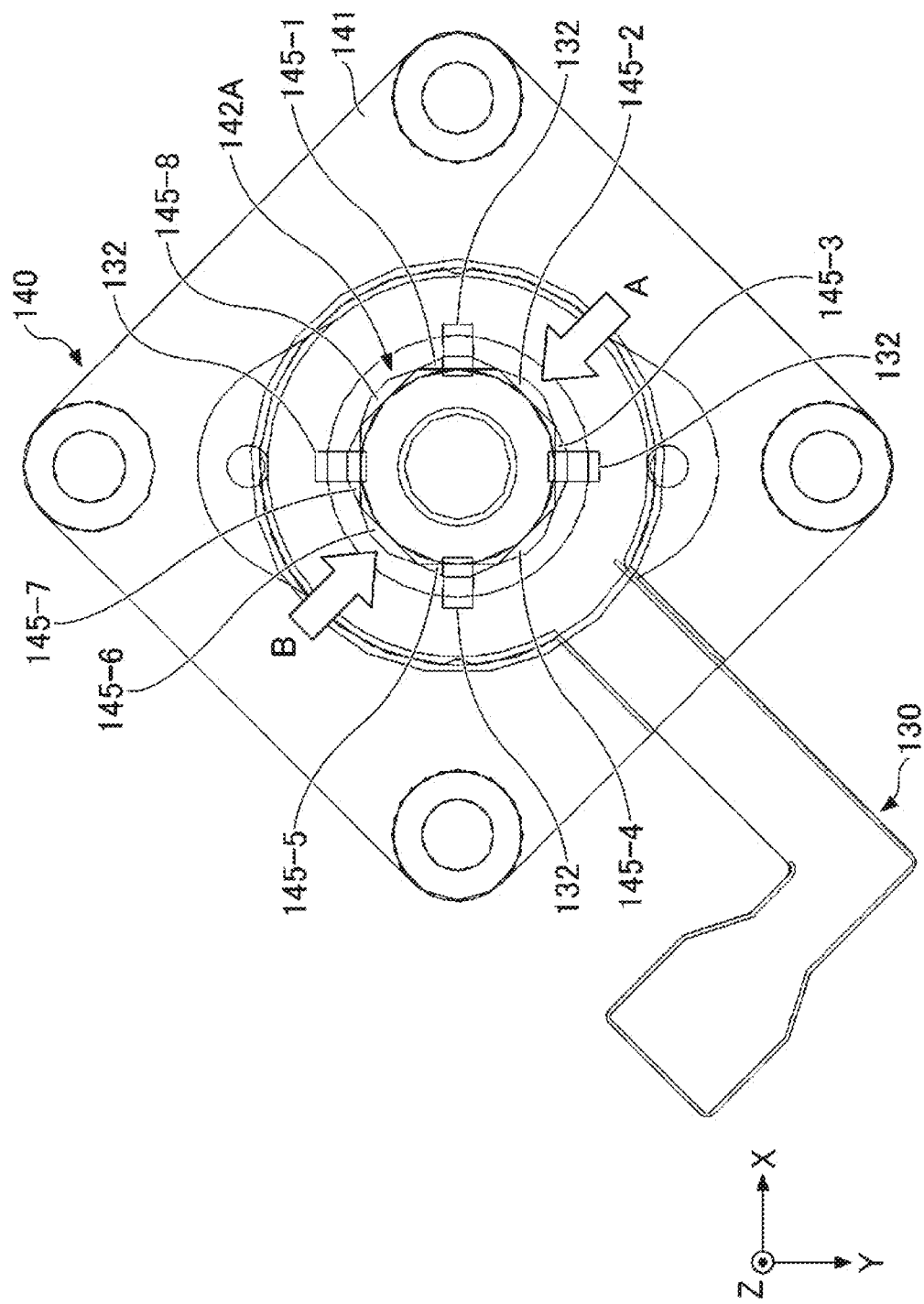
FIG. 9 is a plan view illustrating a layout of strain sensors in an input device according to an embodiment.

FIG. 6 is an enlarged perspective view of a structure of the pillar section 142 of the strain generation body 140 in the input device 100 according to the embodiment. FIG. 7 is a plan view of a structure of the pillar section 142 of the strain generation body 140 in the input device 100 according to the embodiment. FIG. 8 is a front view illustrating a structure of the pillar section 142 of the strain generation body 140 in the input device 100 according to the embodiment. FIG. 9 is a plan view illustrating a layout of the strain sensors 132 in the input device 100 according to the embodiment.

As illustrated in FIG. 6 to FIG. 9, the pillar section 142 of the strain generation body 140 has a columnar shape and is vertically provided upward (Z-axis positive direction) from a central portion of the upper surface of the base 141 of the strain generation body 140.

Here, as illustrated in FIG. 6 to FIG. 9, the pillar section 142 has protrusions 145 on an outer circumferential surface in a tip portion 142A (an end portion on the Z-axis positive side). The protrusions 145 protrude in horizontal directions. The protrusions 145 are each provided at positions at which load is applied when an output inspection of the strain sensors 132 is performed. More specifically, the pillar section 142 according to the embodiment has the protrusions 145 in predetermined directions such that load can be applied at accurate positions from the predetermined directions.

In this embodiment, the protrusions 145 of the pillar section 142 are eight protrusions 145 (protrusions 145-1 to 145-8) provided on the outer circumferential surface in the tip portion 142A of the pillar section 142 at equal angular intervals (i.e. intervals of 45°).

The four protrusions 145 (the protrusions 145-1, 145-3, 145-5, 145-7) of the eight protrusions 145 are provided, with respect to the center of the pillar section 142, in four directions (i.e. the X-axis positive direction, the X-axis negative direction, the Y-axis positive direction, and the Y-axis negative direction) that are the same directions as the four directions in which the four strain sensors 132 are provided.

The other four protrusions 145 (the protrusions 145-2, 145-4, 145-6, 145-8) of the eight protrusions 145 are provided, with respect to the center of the pillar section 142, in four directions that are different by 45 degrees from the four directions in which the four strain sensors 132 are provided.

This structure enables the input device 100 according to the embodiment to apply load at accurate positions from the respective predetermined eight directions to the pillar section 142 in inspecting the four strain sensors 132.

For example, the input device 100 according to the embodiment, with respect to the respective four directions (i.e. the X-axis positive direction, the X-axis negative direction, the Y-axis positive direction, and the Y-axis negative direction) that are the same directions as the four directions in which the four strain sensors 132 are provided, applies a load to the pillar section 142 from these directions to measure changes in the four strain sensors 132, thereby performing the inspection of the four strain sensors 132 with high accuracy.

In such a case, for example, in the first inspection, the X-axis positive direction is defined as a first inspection direction, and a load is applied to the pillar section 142 from the first inspection direction to the protrusion 145-1 (see FIG. 9) provided in the first inspection direction, and thus, the output of the two strain sensors 132 disposed along the X-axis can be inspected.

Then, in the second inspection, the X-axis negative direction is defined as a second inspection direction, and a load is applied to the pillar section 142 from the second inspection direction to the protrusion 145-5 (see FIG. 9) provided in the second inspection direction, and thus, the output of the two strain sensors 132 disposed along the X-axis can be inspected.

Then, in the third inspection, the Y-axis positive direction is defined as a third inspection direction, and a load is applied to the pillar section 142 from the third inspection direction to the protrusion 145-3 (see FIG. 9) provided in the third inspection direction, and thus, the output of the two strain sensors 132 disposed along the Y-axis can be inspected.

Then, in the fourth inspection, the Y-axis negative direction is defined as a fourth inspection direction, and a load is applied to the pillar section 142 from the fourth inspection direction to the protrusion 145-7 (see FIG. 9) provided in the fourth inspection direction, and thus, the output of the two strain sensors 132 disposed along the Y-axis can be inspected.

These four inspections can sort the components into good ones and defective ones. In addition, based on the results of the four inspections, coefficients for adjusting their sensitivities can be written in the control device 170. The use of the sensitivity adjustment coefficients enables the adjustment of values to be output by the control device 170 to have the same sensitivity even if the sensitivities of the strain sensors 132 are different from each other. Accordingly, products to be discarded as defective ones can be reduced and the sensitivities in all directions can be adjusted to have the same sensitivity.

In addition, for example, the input device 100 according to the embodiment, with respect to the respective opposite two directions among the four directions that are different by 45 degrees from the four directions in which the four strain sensors 132 are disposed, applies a load to the pillar section 142 from these directions to measure changes in the four strain sensors 132, thereby performing an inspection of the four strain sensors 132 in a simplified manner.

In such a case, for example, as illustrated in FIG. 9, in the first inspection, the direction between the X-axis positive direction and the Y-axis positive direction is defined as a first inspection direction, and a load is applied to the pillar section 142 from the first inspection direction (arrow A in FIG. 9) to the protrusion 145-2 provided in the first inspection direction. By decomposing the vector of the load, it can be considered that the load is applied from both the X-axis positive direction and the Y-axis positive direction, and thus, the output of the two strain sensors 132 disposed along the X-axis and the output of the two strain sensors 132 disposed along the Y-axis can be simultaneously inspected.

Then, as illustrated in FIG. 9, in the second inspection, a direction between the X-axis negative direction and the Y-axis negative direction, which is the direction opposite to the first inspection direction, is defined as a second inspection direction, and a load is applied to the pillar section 142 from the second inspection direction (arrow B in FIG. 9) to the protrusion 145-6 provided in the second inspection direction. By decomposing the vector of the load, it can be considered that the load is applied from both the X-axis negative direction and the Y-axis negative direction, and thus, the output of the two strain sensors 132 disposed along the X-axis and the output of the two strain sensors 132 disposed along the Y-axis can be simultaneously inspected.

In this inspection, output values in the four directions can be obtained by two inspections, and thus, sensitivity adjustment coefficients for adjusting the sensitivities in respective directions can be calculated.

In other words, the input device 100 according to the embodiment can inspect the four strain sensors 132 with high accuracy by performing inspections four times and can inspect the four strain sensors 132 in a simplified manner by performing inspections twice.

As described above, the input device 100 according to the embodiment has the protrusions 145 in which respective two protrusions 145 protrude in the directions opposite to each other (in the above example, the first inspection direction and the second inspection direction) with respect to the center of the pillar section 142. The two protrusions 145 are provided, with respect to the center of the pillar section 142, in the directions different from the four directions in which the four strain sensors 132 are provided.

With this structure, the input device 100 according to the embodiment can inspect outputs of the four strain sensors 132 by applying a load to the two protrusions 145 in two simple inspections. In these inspections, the input device 100 according to the embodiment can use the two protrusions 145 as references for the application direction of a load in the two simple inspections. Accordingly, in the simple inspections, the input device 100 can apply a load to the pillar section 142 from the accurate directions to accurate positions.

In the input device 100 according to the embodiment, the protrusions 145 are the eight protrusions 145 provided on the outer circumferential surface in the tip portion 142A of the pillar section 142 at equal angular intervals. The four protrusions 145 among the eight protrusions 145 are provided, with respect to the center of the pillar section 142, in the same four directions as the four directions in which the four strain sensors 132 are provided, and the other four protrusions 145 of the eight protrusions 145 are provided, with respect to the center of the pillar section 142, in the four directions different by 45 degrees from the four directions in which the four strain sensors 132 are provided.

With this structure, the input device 100 according to the embodiment has the eight protrusions 145, enabling the application of a load to the pillar section 142 from the accurate directions to accurate positions in both two simple inspections and four highly accurate inspections.

In the input device 100 according to the embodiment, the pillar section 142 has a shape having a rotational symmetry at an angle of 45°. More specifically, the eight protrusions 145 provided in the tip portion 142A of the pillar section 142 have the same shape.

With this structure, when a load is applied to the pillar section 142 from any of the four directions (the X-axis positive direction, the X-axis negative direction, the Y-axis positive direction, and the Y-axis negative direction), which are operation directions, the input device 100 according to the embodiment can cause a strain of an amount corresponding to the applied load to the base 141 of the strain generation body 140. Accordingly, the deformation amounts of the four strain sensors 132 can be equalized, and thus, the inspection accuracy can be increased.

In the input device 100 according to the embodiment, the pillar section 142 has the columnar shape. Accordingly, during the use, when a load is applied from any direction, the input device 100 according to the embodiment can cause a strain in the base 141 of the strain generation body 140 of the amount corresponding to the load, providing uniform operation sensitivity in all directions.

Non-Undercut Shape of Tip Portion 142A

FIG. 10 is a view schematically illustrating a manufacturing process of the strain generation body 140 in the input device 100 according to the embodiment.

In FIG. 10, a mold 11 is used to form right half (Y-axis positive side) of the strain generation body 140. A mold 12 is used to form left half (Y-axis negative side) of the strain generation body 140.

In a process of manufacturing the strain generation body 140, in a state in which the mold 11 and the mold 12 are coupled to each other, a resin is injected into a space having the same shape as the strain generation body 140 formed between the mold 11 and the mold 12. Then, the mold 11 is slid in the right direction (Y-axis positive direction) (arrow C in FIG. 10) while the mold 12 is slid in the left direction (Y-axis negative direction) (arrow D in FIG. 10) to release the molds 11 and 12 from the strain generation body 140.

Here, the tip portion 142A of the pillar section 142 of the strain generation body 140 has a non-undercut shape that enables the two molds 11 and 12, which slide in the opposite directions (the Y-axis positive direction and the Y-axis negative direction) with respect to the center of the pillar section 142, to be released.

More specifically, each of the eight protrusions 145 in the tip portion 142A is configured such that a triangular-shaped second slope 145C has an inclination angle set so as not to have an undercut shape when the two molds 11 and 12 are released.

For example, as illustrated in FIG. 10, the second slope 145C of the protrusion 145-8 on the X-axis positive side and the second slope 145C of the protrusion 145-6 on the X-axis negative side, which are provided on the left side (Y-axis negative side) of the tip portion 142A, both have an inclination angle of 0° or greater with respect to the Y-axis. With this structure, when the mold 12 is slid in the left direction (Y-axis negative direction), the mold 12 can be released from the strain generation body 140 without the interference of the second slope 145C of the protrusion 145-8 on the X-axis positive side and the second slope 145C of the protrusion 145-6 on the X-axis negative side.

Similarly, as illustrated in FIG. 10, the second slope 145C of the protrusion 145-2 on the X-axis positive side and the second slope 145C of the protrusion 145-4 on the X-axis negative side, which are provided on the right side (Y-axis positive side) of the tip portion 142A, both have an inclination angle of 0° or greater with respect to the Y-axis. With this structure, when the mold 11 is slid in the right direction (Y-axis positive direction), the mold 11 can be released from the strain generation body 140 without the interference of the second slope 145C of the protrusion 145-2 on the X-axis positive side and the second slope 145C of the protrusion 145-4 on the X-axis negative side.

As described above, the strain generation body 140 of the input device 100 according to the embodiment can be manufactured by using the two molds 11 and 12, reducing the costs of production of the strain generation body 140.

In the input device 100 according to the embodiment, when viewed from the horizontal direction, each of the eight protrusions 145 has a mountain-like shape including a pair of trapezoidal first slopes 145B provided to face each other in the up-down direction (Z-axis direction) with a horizontal linear top portion 145A provided at the center between the first slopes 145B, and a pair of triangular second slopes 145C provided to face each other in the horizontal direction with the top portion 145A provided between the second slopes 145C.

This structure enables the input device 100 according to the embodiment to apply a load to the top portion of the protrusion 145 to apply the load to the center of the protrusion 145, and accordingly, the load can be applied stably to the pillar section 142 in inspecting the four strain sensors 132.

While the embodiment of the present invention has been described in detail, it is to be understood that the invention is not limited to this embodiment, various modifications or changes may be made within the scope of the invention described in the claims.

What is claimed is:

1. An input device comprising:
   a strain generation body having a base and a pillar section extending from the base in a vertical direction; and
   four strain sensors disposed to the base of the strain generation body, wherein
   the four strain sensors are disposed in four directions different by 90° with respect to a center of the pillar section,
   the pillar section has protrusions on an outer circumferential surface in a tip portion, and the protrusions protrude in a horizontal direction,
   the protrusions includes:
      two protrusions protruding in directions opposite to each other with respect to the center of the pillar section; and
      the two protrusions are provided, with respect to the center of the pillar section, in directions different from the four directions in which the four strain sensors are disposed, and
   when viewed from the horizontal direction, each of the protrusions has a mountain-like shape, and the mountain-like shape includes:
      a pair of first slopes provided to face each other in the vertical direction with a top portion provided at a center between the first slopes; and
      a pair of second slopes provided to face each other in the horizontal direction with the top portion provided between the second slopes.

2. The input device according to claim 1, wherein the protrusions are eight protrusions, and
   in the eight protrusions:
      a first set of four protrusions of the eight protrusions is provided, with respect to the center of the pillar section, in same four directions as the four directions in which the four strain sensors are provided; and
      a second set of the four protrusions of the eight protrusions is provided, with respect to the center of the pillar section, in four directions different by 45° from the four directions in which the four strain sensors are disposed, and the second set is different from the first set.

3. An input device comprising:
   a strain generation body having a base and a pillar section extending from the base in a vertical direction; and
   four strain sensors disposed to the base of the strain generation body, wherein
   the four strain sensors are disposed in four directions different by 90° with respect to a center of the pillar section,
   the pillar section has eight protrusions on an outer circumferential surface in a tip portion, and the protrusions protrude in a horizontal direction,
   in the eight protrusions:
      a first set of four protrusions of the eight protrusions is provided, with respect to the center of the pillar section, in same four directions as the four directions in which the four strain sensors are provided; and
      a second set of the four protrusions of the eight protrusions is provided, with respect to the center of the pillar section, in four directions different by 45° from the four directions in which the four strain sensors are disposed, and the second set is different from the first set, and
   the pillar section has a shape having a rotational symmetry at an angle of 45°.

4. The input device according to claim 3, wherein the tip portion of the pillar section has a non-undercut shape that enables two molds to be released, the two molds being slidable in the opposite directions with respect to the center of the pillar section.

5. The input device according to claim 4, wherein
   when viewed from the horizontal direction, each of the eight protrusions has a mountain-like shape, and the mountain-like shape is configured with:
      a pair of trapezoidal first slopes provided to face each other in the vertical direction with a top portion provided at a center between the first slopes; and
      a pair of triangular second slopes provided to face each other in the horizontal direction with the top portion provided between the second slopes.

6. The input device according to claim 5, wherein the pillar section has a columnar shape.

7. An input device comprising:
   a strain generation body having a base and a pillar section extending from the base in a vertical direction;
   four strain sensors disposed to the base of the strain generation body;
   an operation member disposed above the pillar section, the operation member having a shaft portion passing through the pillar section in the vertical direction;
   a movable contact disposed under the shaft portion; and
   a stationary contact disposed under the movable contact, wherein
   the four strain sensors are disposed in four directions different by 90° with respect to a center of the pillar section,
   the pillar section has protrusions on an outer circumferential surface in a tip portion, and the protrusions protrude in a horizontal direction, and
   the protrusions includes:
      two protrusions protruding in directions opposite to each other with respect to the center of the pillar section; and
      the two protrusions are provided, with respect to the center of the pillar section, in directions different from the four directions in which the four strain sensors are disposed.

8. An input device comprising:
   a strain generation body having a base and a pillar section extending from the base in a vertical direction;

four strain sensors disposed to the base of the strain generation body; and an operation member disposed above the pillar section, the operation member having a shaft portion passing through the pillar section in the vertical direction, wherein the four strain sensors are disposed in four directions different by 90° with respect to a center of the pillar section, the pillar section has eight protrusions on an outer circumferential surface in a tip portion, and the protrusions protrude in a horizontal direction, and in the eight protrusions:
- a first set of four protrusions of the eight protrusions is provided, with respect to the center of the pillar section, in same four directions as the four directions in which the four strain sensors are provided; and
- a second set of the four protrusions of the eight protrusions is provided, with respect to the center of the pillar section, in four directions different by 45° from the four directions in which the four strain sensors are disposed, and the second set is different from the first set.

* * * * *